United States Patent Office 2,901,241
Patented Aug. 25, 1959

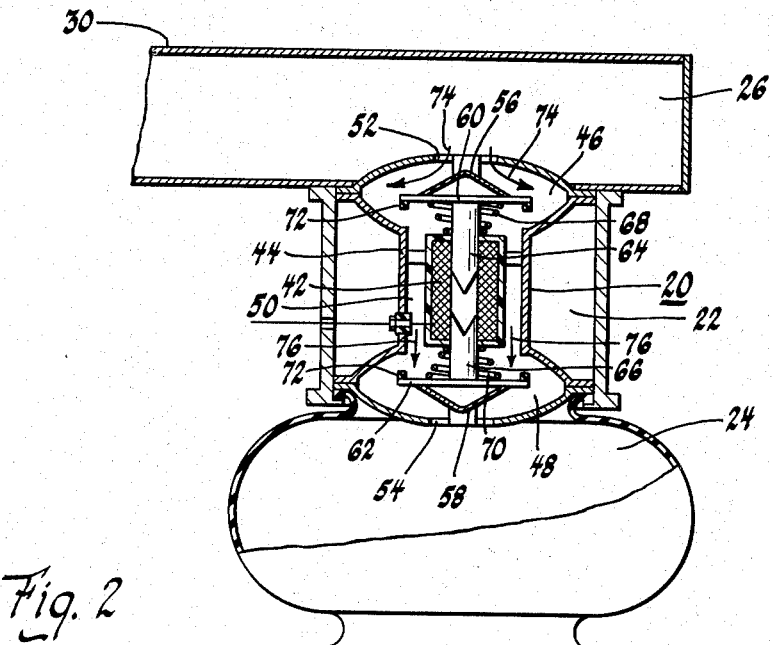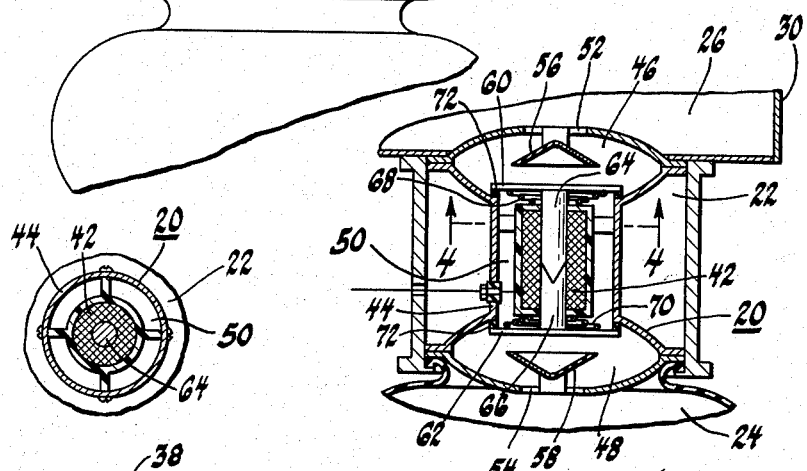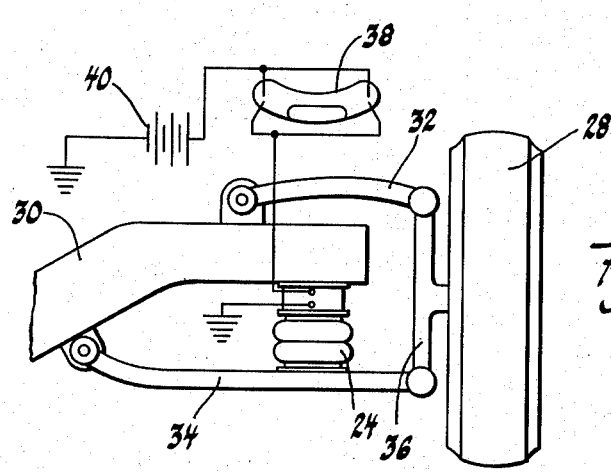

2,901,241
CONTROL DEVICE

Argyle G. Lautzenhiser, Anderson, Ind., and Kenneth E. Faiver, Lansing, Mich., assignors to General Motors Corporation, Detroit, Mich., a corporation of Delaware Application July 10, 1956, Serial No. 597,021

6 Claims. (Cl. 267—11)

This invention relates to control devices and more particularly to a valve means which is adapted to control the flow of fluids through a conduit such as is used in the fluid suspension system of a motor vehicle.

Fluid suspension systems in motor vehicles are usually provided with a chamber of variable volume which is positioned between the sprung and the unsprung mass of a vehicle. This variable volume chamber usually is filled with a compressible fluid such as air and is arranged to insulate the unsprung mass from road shocks, etc. and to constantly maintain a predetermined vertical distance between the masses. The present invention is directed to a control device for use in a suspension system of the above type and is particularly directed to a valve means installable in a passage between the variable volume chamber and a fluid reservoir.

It is an object therefore of the present invention to provide a valve means which is suitable for use in controlling the flow of fluids in a passageway between a primary and secondary fluid chambers in a vehicle suspension system.

A further object of the present invention is to include a valve means in the passageway between a primary and secondary chamber in a fluid suspension system for a motor vehicle which has a constant resistance to fluid flow regardless of the direction of flow therethrough when the valve is open.

Another object of the present invention is to include a valve means in the passageway between a primary and secondary chamber in a fluid suspension system for a motor vehicle which has a constant resistance to fluid flow regardless of the direction of flow therethrough when the valve is open and which has a constant resistance to closing in both directions regardless of the volume of fluid flow when the valve is moved from an open to a closed position.

A still further object of the present invention is to include a double ended solenoid valve means in the passageway between the primary and secondary fluid chambers in a vehicle suspension system which valve means when closed will increase the effective spring rate of the primary chamber.

Another object of the present invention provides a valve means, suitable for use in a fluid suspension system for a vehicle, that has a double ended solenoid operating a pair of spaced valve discs which are arranged so the pressure of fluid flow through said valve means will aid the movement of the valve discs by the solenoid to a closed position regardless of the direction or intensity of fluid flow through said valve means.

In carrying out the above objects it is a further object to provide baffles in a solenoid actuated valve means so the valves will not tend to move to a closed position when large volumes of fluid are flowing through the valve means unless the solenoid is energized.

Further objects and advantages of the present invention will be apparent from the following description, reference being had to the accompanying drawings, wherein a preferred embodiment of the present invention is clearly shown.

In the drawings:

Fig. 1 diagrammatically shows the valve means according to the present invention as installed in a motor vehicle fluid suspension system.

Fig. 2 is a cross-sectional view of the valve means according to the present invention as included in the passageway between two fluid chambers wherein the valve is in an open position.

Fig. 3 shows the valve means in Fig. 2 in a closed position.

Fig. 4 is a cross-sectional view along lines 4—4 in Fig. 3.

In the drawings the valve means 20 is shown as included in a passageway 22 which connects a primary variable volume fluid chamber 24 with a secondary fluid chamber 26. The primary fluid chamber 24 is preferably positioned between the sprung mass 30 and the unsprung mass 28 of a motor vehicle. For purposes of definition, when these terms are used, the term sprung mass includes those portions of a motor vehicle which are normally supported by the unsprung mass. That is, the parts of the vehicle which include the body fenders, etc., are supported through various hinged or movable joints on the wheels of the vehicle. In the embodiment in Fig. 1, the cross member which provides the reservoir 30 normally would be considered the sprung mass and the links 32 and 34, as well as the king pin 36 and wheels 28, would be considered the unsprung mass. The primary variable volume chamber 24 in the preferred embodiment will comprise a suitable elastomeric bag of well known construction which is filled with a suitable compressible fluid, such as air. The present invention is directed to a valving means which will control the flow of fluid between the primary chamber 24 and the secondary chamber 26. This control may be utilized for various purposes and in the embodiment shown in Fig. 1 the valve means is made responsive to the operation of a roll switch 38. This roll switch is preferably located on the motor vehicle to complete a circuit between a battery 40 and the solenoid coil winding 42 of the valve means 20. The roll switch 38 will close this circuit whenever the vehicle changes its forward course, while traveling at speeds which would normally cause the vehicle to lean from its normal vertical position. When the roll switch 38 is actuated the valve means 20 will close the passage 22 between the chambers 24 and 26. This will cause a decrease in the effective volume of the chamber 24 so as to increase its spring rate and thereby minimize the tendency of the vehicle to lean in the turn. That is, it will cause the vehicle to maintain a more level attitude while the vehicle is negotiating a turn.

The valve means 20 shown includes an outer casing 44 which has a pair of axially spaced chambers 46 and 48 on opposite ends of the casing 44. These chambers 46 and 48 are interconnected by a passage 50. The casing 44 has an opening 52 which connects the chamber 46 with chamber 26. The chamber 48 is connected with chamber 24 through an opening 54. A baffle 56 which is formed as shown is included adjacent the opening 52 in chamber 46. Similarly a baffle 58 is included in chamber 48 proximate the opening 54. Also included in the chambers 46 and 48, respectively, are valve discs 60 and 62. Positioned within the passage 50 is the solenoid coil 42 as shown in Fig. 4. This solenoid coil has a single coil winding which is energized when switch 38 is closed to simultaneously move a pair of plungers 64 and 66 from the position shown in Fig. 2 to the position shown in Fig. 3. The plunger 64 is suitably connected with valve disc 60 while the plunger 66 is connected to the valve disc 62. The valve discs 60 and 62 are normally urged to the position shown in Fig. 2 to engage baffles 56 and 58, respectively, by coil springs 68 and 70, respectively. Each of the valve discs 60 and 62 have an annular elastomeric ring 72 secured on the periphery thereof. These rings 72 are arranged to be moved into sealing engagement with the wall portion of the chambers 46 and 48 which are adjacent to the passage 50.

When the solenoid winding 42 is de-energized, valve discs 60 and 62 will be in the position shown in Fig. 2 so as to permit the rapid passage of air in either direction between chambers 24 and 26. When the air passes from chamber 24 to 26 little, if any, force will be imposed upon the valve discs to cause them to move to the closed position because of the location and shape of baffles 56 and 58 which cause the air flow which would normally be directed perpendicular to the valve discs and thereby cause the spring 68 or 70 to be compressed, to be directed substantially radially relative to the valve disc as seen by the arrows 74, assuming the air to be flowing from the chamber 26 to 24. When the windings of solenoid core 42 are energized, the plungers 64 and 66 will move to cause valve disc 60 to move downward and the valve disc 62 to move upward in opposition to springs 68 and 70. During this period the air flowing in the direction of arrows 76 would tend to oppose the closing of the valve disc 62. However, at the same time the valve disc 60 will be unopposed in its closing. This will cause the intensity of air flow as represented by arrow 76 to be reduced so that the force opposing the closing of valve disc 62 will be diminished to permit valve disc 62 to be closed practically simultaneously with valve disc 60. From the above it is manifest that the resistance to closing will be practically constant regardless of the direction or intensity of fluid flow through the valve. Further, as the valve parts which are associated with chamber 46 are identical with the valve parts which are associated with chamber 48, the resistance to flow in either direction through the valve means 20 will be constant when the valve discs 60 and 62 are in the open position.

Another advantage of the valve means is that while the valve is designed to permit large volumes of air to flow between chambers 26 and 24, only a small current will be required to control this air flow. This is accomplished by eliminating the effect of fluid flow on the valve closing so that the solenoid 42 may be of minimum size and current capacity.

While the embodiment of the present invention as herein disclosed, constitutes a preferred form, it is to be understood that other forms might be adopted.

What is claimed is as follows:

1. In a suspension system for a motor vehicle having an unsprung and sprung mass resiliently supported on said unsprung mass by a variable volume fluid chamber and a reservoir having a fluid connection with said chamber for supplying and receiving fluid from said chamber in accord with volumetric variations in said chamber, valve means in said fluid connection controlling the flow of fluid through said connection, said valve means comprising a pair of spaced valve chambers one of which has fluid connection with said reservoir and the other of which has fluid connection with said variable volume fluid chamber, a passage interconnecting said valve chambers, a valve disc in each chamber arranged to move from an open valve position to a closed valve position for sealing said valve chambers from said passage, and means concurrently moving said discs in opposite directions to valve closing positions with resistance to movement of said discs to said closed position remaining substantially constant during the said closing regardless of the direction of fluid flow in the connection between said reservoir and said variable volume fluid chamber.

2. A valve of the character described comprising; a casing having a passage and a pair of axially spaced chambers on opposite ends of said passage arranged for fluid flow therethrough, means including a valve disc in one of said chambers arranged for normally permitting fluid flow through said casing and movable to a closed position for preventing fluid flow through said casing in one direction, means including a valve disc in the other of said chambers arranged for normally permitting fluid flow through said casing and movable to a closed position for preventing fluid flow in the opposite direction, and an electromagnet for simultaneously moving the valve discs in both chambers to said closed positions in opposed direction whereby the closing of said valve discs will be unaffected by fluid flow through said casing.

3. A valve of the character described comprising; a casing having a passage and a pair of axially spaced chambers on opposite ends of said passage arranged for fluid flow through said casing, a valve disc in one of said chambers arranged for preventing fluid flow through said casing in one direction, a valve disc in the other of said chambers arranged for preventing fluid flow in the other direction, means for normally urging each of said valve discs to a predetermined position for permitting said fluid flow in either direction, baffle means in each of said chambers providing a limit stop for the valve disc in said chamber and for directing fluid around said disc when said fluid flows in a direction to first engage the baffle means, and a means including a magnetic coil and a magnet plunger for each of said discs for simultaneously moving said discs from said predetermined position in opposed direction to valve closing position.

4. A valve of the character described comprising; a casing having a pair of spaced chambers on opposite ends, a passage connecting said chambers, an an opening in each of said chambers axially aligned with said passage and arranged so a fluid entering either of said openings may exit through the other opening; a baffle in each of said chambers for deflecting the fluid entering the opening in said chamber, a valve disc in each of said chambers arranged when moved to an open position to engage the baffle in the chamber wherein the valve disc is positioned and when moved to a closed position to engage a wall portion of said chamber, and means including a single electromagnet coil and an individual electromagnet plunger for each valve disc for simultaneously moving each said valve disc from an open to a closed position whereby a constant resistance to moving of the valve discs from the open to closed position is accomplished regardless of the volume or direction of fluid flow through said casing.

5. In a suspension system for a motor vehicle having an unsprung mass and a sprung mass wherein a variable volume primary chamber is arranged between said masses for supporting the sprung mass on the unsprung mass and a fluid reservoir has a fluid connection with said primary chamber increasing the effective volume of said primary chamber when the fluid reservoir is in fluid connection with the said primary chamber, valve means comprising two normally open valves in said fluid connection controlling fluid flow through the fluid connection between said primary chamber and reservoir, said valves being arranged within the valve means to effect a constant resistance to closing on fluid flow through said connection in both directions, electromagnetic means for actuating both of said valves concurrently to closed position, and switch means mounted on the sprung mass controlling said electromagnetic means.

6. In a suspension system for a motor vehicle having an unsprung mass and a sprung mass resiliently supported on said unsprung mass by a variable volume primary chamber and a fluid reservoir having a fluid connection with said primary chamber to supply and receive fluid from said chamber in accord with volumetric variations in said chamber, valve means controlling said fluid connection comprising a pair of reciprocable valve members in said fluid connection oppositely faced and arranged to provide constant resistance to fluid flow regardless of the direction of said flow when said valve members are in open position, and electrical means for simultaneously actuating said valve members to closed position to close said fluid connection.

References Cited in the file of this patent

UNITED STATES PATENTS

| | | |
|---|---|---|
| 1,446,759 | Mercier | Feb. 27, 1923 |
| 2,124,124 | Schoepf et al. | July 19, 1938 |
| 2,180,492 | Wilson et al. | Nov. 21, 1939 |